United States Patent

Singh et al.

[11] Patent Number: 6,127,644
[45] Date of Patent: Oct. 3, 2000

[54] ELECTROSLAG SURFACING USING WIRE ELECTRODES

[75] Inventors: Daya Singh, Hendersonville; Ravi Menon, Goodlettsville, both of Tenn.

[73] Assignee: Stoody Company, St. Louis, Mo.

[21] Appl. No.: 09/299,872

[22] Filed: Apr. 27, 1999

[51] Int. Cl.[7] .............................. B23K 9/24; B23K 9/04
[52] U.S. Cl. ...................... 219/73.11; 219/76.1; 228/214
[58] Field of Search ............................. 219/73.11, 76.1; 228/225, 226, 214

[56] References Cited

U.S. PATENT DOCUMENTS

| | | | |
|---|---|---|---|
| 3,752,216 | 8/1973 | Fritsche | 164/252 |
| 3,777,106 | 12/1973 | Nuccel | 219/76 |
| 3,841,923 | 10/1974 | Dudko et al. | 148/26 |
| 4,000,010 | 12/1976 | Sekimoto et al. | 148/3 |
| 4,373,128 | 2/1983 | Asai et al. | 219/73.11 |
| 4,404,450 | 9/1983 | Weldon | 219/76.12 |
| 4,707,581 | 11/1987 | Blaskovits et al. | 219/73.11 |
| 5,068,507 | 11/1991 | Dick et al. | 219/73.11 |
| 5,669,364 | 9/1997 | Everingham | 123/568 |

FOREIGN PATENT DOCUMENTS 1511655   5/1975   United Kingdom ............ B22D 11/04

OTHER PUBLICATIONS

ASM Handbook vol. 6 Welding, Brazing, and Solering. Alia, Bruno. 1993. p. 275.
Metalworking Technology Update: Summer 1994.

Primary Examiner—Patrick Ryan
Assistant Examiner—Jonathan Johnson
Attorney, Agent, or Firm—Senniger, Powers, Leavitt & Roedel

[57] ABSTRACT

A method for depositing corrosion and wear resistant high alloy overlayers on industrial component substrates. Dilution of alloying components from out of the overlayer into the substrate is minimized by use of electroslag surfacing onto horizontally positioned surfaces of the substrate using oscillating wire.

15 Claims, 4 Drawing Sheets

ELECTROSLAG SURFACING USING WIRE ELECTRODES

BACKGROUND OF THE INVENTION

The present invention relates generally to a method of hard facing iron-based industrial components subjected to service conditions requiring good resistance to corrosion and wear such as rolls for steel mills and paper plants, ship and submarine main propulsion shafts, mining equipment, construction equipment, agricultural equipment, and pipes.

Weld surfacing of machine or industrial components to modify surface properties has been a common engineering practice. Submerged arc welding (SAW) is the most commonly used process for surfacing steel mill rolls; either wire or strip electrodes can be used for this purpose. Surfacing by SAW using strip electrodes was first employed in the early 1960s and has been extensively used in the industry since then as disclosed in Campbell, H. C. and Johnson, W. C. "Cladding and Overlay Welding with Strip Electrodes," Weld. J., Vol. 45(5), 1966, 99 399–409. However, SAW is an inherently high dilution process, requiring a multiple layer deposit. Dilution occurs when alloy constituents such as Cr and Ni which are typically found in significantly higher concentrations in an electrode alloy than in substrate alloys diffuse into the molten substrate. The result is disadvantageous loss of constituents into the substrate which constituents are intended for the overlayer. SAW is a high dilution process because the force of the arc penetrates deeper into the substrate thereby melting more of the substrate for the electrode alloy constituents to diffuse into. Also, the force of the arc tends to facilitate the diffusion of the electrode alloy constituents by mixing the molten substrate and electrode alloy together. Thus, because of the high dilution, surfacing operations using SAW usually require three or more layers to obtain the desired deposit chemistry, resulting in increased labor and material costs.

In the 1930s electroslag welding was developed by Hopkins in the United States. In 1971 a new process that combined electroslag welding characteristics with SAW strip surfacing was discovered. This was reported by Seidel, G. and Hess, H. in "Investigation of Electroslag Strip Cladding with Strip Electrodes," Schweissen und Schneiden, Vol. 23(10), 1971, pp 410–411. The new technique was eventually named electroslag surfacing (ESS) or electroslag strip cladding. Unlike electroslag welding which requires a mold or supporting surface, ESS operates in a flat or horizontal position with a rather shallow layer of molten slag. There is no arc during ESS except at the start of the process. Heat generated by ohmic heating of a molten slag pool melts filler metal (electrode), base metal (substrate) and flux to maintain a dynamically steady slag pool that helps to generate heat for the process and shields the molten metal from the atmosphere. The ESS process combines high deposition rates with low dilution, two mutually exclusive conditions in conventional arc welding processes. The uniform shallow penetration allows for more effective and easier alloy adjustment in the strip electrode to achieve the desired deposit chemistry, cleaner deposits, lower oxygen content and better slag detachment as reported by Gao, Y. P., Devletian, J. H. and Wood, W. E. in "Electroslag and Submerged Arc Cladding Ni Alloy 625," 73$^{rd}$ Annual AWS Convention, Chicago, Ill. 1992.

ESS with strip electrodes is widely used in Germany, Japan and to some extent in the United States. However, it is difficult to produce strip electrodes with certain high alloy compositions because, for example, the brittle nature or other properties of such compositions is not compatible with strip-forming processes. Thus, ESS with strip electrodes is limited to deposition of alloys which are readily formable into strip electrodes. Strip electrodes can be expensive and economically unattractive, or otherwise not feasible in certain applications.

The use of wires rather than strips in ESS is a candidate for overcoming the limitations of ESS with strips. However, the use of wires has its own limitations, such as difficulty in controlling free flow of a molten slag pool off of curved surfaces of substrates, and the fact that wire electrodes typically produce a non-uniform penetration profile which is much deeper where the axis of the wire intersects the substrate than at surrounding locations.

U.S. Pat. No. 4,000,010 discloses a process using consumable and non-consumable wire electrodes in electroslag surfacing of a roll. This process, however, is a relatively high dilution process because there is substantial contact between fresh substrate and molten slag prior to the substrate contacting molten metal being deposited. Further, the orientation of this process requires use of a cumbersome system employing a start tab and a dam to retain metal being deposited.

SUMMARY OF THE INVENTION

It is an object of the invention, therefore, to provide a process for depositing high alloys onto iron-based substrates by ESS with a consumable electrode comprising at least one alloy-cored or solid wire; to provide such a process which results in a low dilution deposit; to provide such a process which results in a uniform penetration profile; to provide such a process which produces a flat bead shape with smooth tie-in between adjacent deposits; to provide such a process which produces a deposit having a low oxygen content; and to provide such a process which provides flexibility in deposit chemistry by optionally employing filled-core wires.

Briefly, therefore, the invention is directed to a method for depositing a high alloy stainless steel overlayer onto a substrate. Between one and six wire electrodes are oscillated above the substrate. Flux is fed onto the substrate while applying a total current to the electrodes sufficient to create and maintain a molten slag pool by ohmic heating of the electrodes, flux and substrate to deposit the overlayer by electroslag surfacing onto the substrate.

The invention is also directed to a method for depositing a high alloy stainless steel overlayer onto an elongate cylindrical substrate. The substrate is secured horizontally in a fixture adapted to rotate the substrate about a horizontal axis thereof, the substrate having a circumference comprising a bottom arcuate segment, two side arcuate segments, and a top arcuate segment directly opposite and above the bottom arcuate segment. An electrode comprising at least one wire is maintained above the top arcuate segment of the substrate while feeding flux onto the top arcuate segment. A total current is supplied to the electrode sufficient to create and maintain a molten metal pool and a molten slag pool by ohmic heating of the electrode, flux and substrate to deposit the overlayer onto the top arcuate segment of the substrate. The substrate is rotated about its horizontal axis to continually present fresh substrate to the electrode.

In another aspect the invention is directed to a method for depositing a high alloy stainless steel overlayer onto a roll in which between one and six filled-core wires containing Ni and Cr are maintained above the top arcuate segment of the roll while flux is fed onto the top arcuate segment. The electrode is oscillated at a rate of between about 20 cycles per minute and about 40 cycles per minute while applying a total current to the electrode sufficient to create and maintain a molten metal pool and a molten slag pool by ohmic heating of the electrode, flux and substrate to deposit the overlayer onto the top arcuate segment of the roll. Dilution of Ni and Cr in the overlayer is less than about 25%.

The invention is also directed to a method for depositing a high alloy stainless steel overlayer onto an elongate cylindrical steel mill roll. Two filled-core Ni-containing and Cr-containing wire electrodes spaced apart between about 6 mm and about 25 mm are oscillated at a rate of between about 20 cycles per minute and about 40 cycles per minute with an oscillation path width of between about 13 mm and about 25 mm per electrode while the electrodes are maintained above the top arcuate segment of the roll a distance of between about 25 mm and about 50 mm. Flux is fed onto the top arcuate segment of the roll around the electrodes by a vibrating flux feeder. A total current of between about 300 and about 1200 amps is applied to deposit the overlayer onto the top arcuate segment within a molten slag pool maintained by ohmic heating of the electrodes, flux and roll. Dilution of Ni and Cr in the deposit is maintain below about 25%. The steel mill roll is rotated about its horizontal axis at a speed of between about 100 mm and about 250 mm per minute to continually present fresh roll to the electrodes. A stainless steel brush is held against the roll at a position in front of the electrodes such that the roll is rotated under the brush prior to traveling under the electrodes to prevent molten slag from rolling off the roll. A vacuum pick up is applied at a distance above the molten slag pool to remove excess flux and to increase air flow above the molten slag pool thereby increasing a rate at which the slag pool solidifies.

The invention is further directed to an overlayer on a steel mill caster roll comprising at least a first layer of high alloy steel deposited onto the roll by electroslag surfacing using high alloy wire electrodes, wherein dilution of Cr and Ni in the first layer is less than about 25%.

In another aspect the invention is directed to steel mill caster roll having a high alloy steel overlayer on an iron based elongate core. The overlayer has at least a first layer of high alloy steel deposited onto the roll by electroslag surfacing using high alloy wire electrodes. Dilution of Cr and Ni in the first layer is less than about 25%. Other objects and features of the present invention will be in part apparent and in part pointed out hereinafter.

DETAILED DESCRIPTION OF THE INVENTION

This invention presents a new process for overlaying industrial components such as steel mill rolls which combines the advantages of using wires in terms of the flexibility in overlay alloy composition with the advantages of ESS in terms of low dilution. ESS allows for high deposition rates, low dilution, cleaner deposits, lower oxygen content and better slag detachment. With this new process involving ESS using wire, desired overlay chemistries can be achieved in one or two layers versus up to six layers required with SAW, resulting in considerable savings in material and labor. The process results in excellent flat deposit bead shape and smooth tie-in between deposits of adjacent passes. The weld metal has a very low oxygen content, resulting in fewer inclusions and a cleaner weld deposit compared to conventional SAW overlay deposits. This lower inclusion volume has a beneficial effect on weld metal toughness and corrosion resistance.

In accordance with this invention a new ESS process has been developed where a low penetration deposit can be made using an electrode comprising one or more solid or filled-core wires instead of a strip electrode. Filled-core wires with high alloy content can be more economically fabricated than an equivalent strip, and in many instances alloys which cannot feasibly be formed into strip are available in wire form. This new process using specific wire flux compositions, welding parameters and welding techniques improves the quality of overlay deposits and reduces the costs of surfacing operations.

Figure 1:
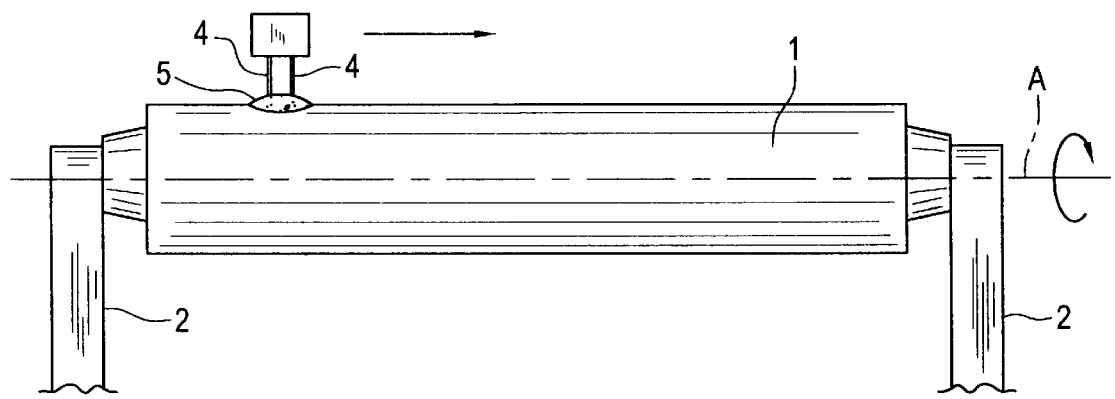
FIG. 1 is a schematic representation of an apparatus for carrying out the invention.
Figure 2:
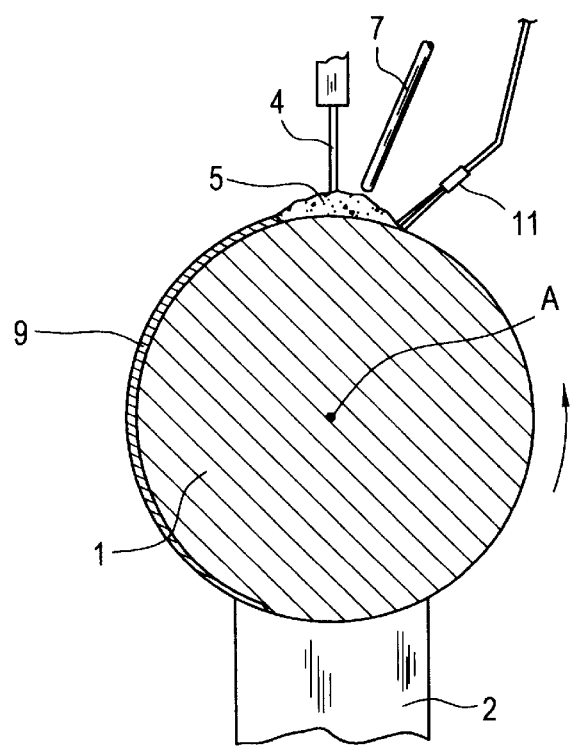
FIG. 2 is a cross-sectional view of the apparatus of FIG. 1.

In carrying out this invention a substrate is positioned such that the area of the substrate to be surfaced is substantially horizontal, according to the orientation illustrated schematically in FIGS. 1 and 2. For example, a steel mill roll 1 is secured in a fixture 2 such that its longitudinal axis A is substantially horizontal. Molten alloy from a solid or filled-core wire electrode or electrodes 4 is deposited onto the uppermost portion of the roll while rotating the roll about its axis. The circumferential surface of the substrate can be imagined as divided into four essentially equal arcuate segments, comprising a bottom arcuate segment, two side arcuate segments, and a top arcuate segment directly opposite and above the bottom arcuate segment. This invention involves deposition onto the top arcuate segment. With each full rotation of the roll the electrode moves longitudinally in the direction of the axis of the roll a distance approximately equivalent to the width of one deposit.

The consumable electrode comprises at least one solid or filled-core wire, preferably between about one and six wires. The diameter of the wire typically ranges from about 1.5 mm (1/16 inch) to about 3.2 mm (1/8 inch), although wire sizes outside this range are possible. One especially preferred embodiment of the invention employs two filled-core wire electrodes each having a diameter of about 2.4 mm (3/32 inch). The filled core wire consists of an alloy powder mixture encased within a carbon steel sheath (e.g., AISE 1008). An acceptable composition for the wire sheath by weight percent is Mn up to 0.5, Si up to 0.5, C up to 0.08, and Fe balance. The following is an acceptable composition for the alloy powder mixture, by weight percent, with a fill ratio of 27% (where fill ratio equals the powder weight divided by the wire weight multiplied by 100):

| | |
|---|---|
| C | 0.45–0.55 |
| Mn | 2.8–3.2 |
| Si | 1.0–1.5 |
| Cr | 47.0–47.9 |
| Ni | 8.5–9.5 |
| Ma | 4.0–4.5 |
| Cb | 0.70–0.80 |
| V | 0.55–0.65 |
| Fe | Balance |

The distance between adjacent wires ranges from about 6 mm (¼ inch) to 25 mm (1 inch). During ESS the distance from the substrate to the contact tip of the electrode ranges from about 25 mm (1 inch) to about 50 mm (2 inches). One especially preferred embodiment employs two wires each having a diameter of about 2.4 mm (3/32 inch), and a distance between wires of about 13 mm (½ inch), with a substrate to contact tip distance of about 38 mm (1½ inches).

Ohmic heating of the slag pool 5 melts the flux, the electrode and the base metal. The slag pool also generates heat for the process and shields the molten metal from the atmosphere. It is important to the process that the slag pool remain at a relatively constant volume. Therefore, as molten metal and slag solidify, additional electrode and flux are fed into the slag pool. The electrode is preferably fed into the center of the slag pool. Flux is typically fed in front of the slag pool via flux feeder 7, that is, onto the substrate surface displaced a short distance circumferentially (rather than longitudinally) from the electrodes, which surface is being rotated under the electrodes. One preferred flux is a high $CaF_2$ flux such as Carbo-Ox 4000 available from Carbo-Ox of Brazil.

The total electrical current ranges between about 300 amps and about 1200 amps, depending on the wire diameter and the number of wires. The electrical voltage ranges between about 20 volts and about 35 volts, depending on wire diameter. The travel speed of the electrode relative to the roll ranges from about 100 mm per minute (four inches per minute) to about 250 mm per minute (ten inches per minute) in a direction circumferentially of the roll. The electrode is preferably oscillated at a rate of from about 20 to about 40 cycles per minute, with an oscillation path of from about 13 mm (½ inch) to about 25 mm (1 inch) wide. The oscillation direction is transverse to the direction in which the electrode is traveling along the surface of the substrate, which in the embodiment involving steel mill rolls is parallel to the longitudinal axis of the roll.

Typically, a layer of hard facing alloy 9 deposited in accordance with the preferred parameters will have a thickness of about 4 mm (0.2 inch) to about 10 mm (0.4 inch).

In accordance with this invention dilution is maintained below about 30%, preferably below about 25%, most preferably at about 20% or lower. In one embodiment where the deposit consists of one layer, dilution is maintained in the range of about 15% to about 25%. In another embodiment where the deposit consists of two layers, total dilution is maintained in the range of about 1% to about 10%, preferably about 1% to about 5%. Dilution is measured by comparing the composition of the electrode to the composition of the deposited alloy for a particular constituent. If, for example, the electrode contains 13.5% Cr and the deposit contains 11% Cr, dilution would be about 20%.

The invention therefore involves an overlayer consisting of at least a first deposited layer 9 on the order of 6 to 10 mm thick in direct contact with the substrate. This first deposited layer is characterized by the aforementioned dilution parameters. On top of the first deposited layer are optionally a second or even additional layers. These layers are not in direct contact with the original substrate in that they are on top of the first deposited layers. These desirable dilution levels are achievable in part because when conducting ESS in a horizontal orientation as disclosed, the molten slag pool rests on top of the molten metal puddle and therefore has reduced contact with the substrate surface. This reduces the degree of heating of the substrate surface thereby reducing dilution of the deposited alloying constituents such as Cr into the substrate.

A major obstacle to ESS using wires has been difficulty in controlling the molten slag pool. As compared to SAW slags, ESS slags are much more fluid and therefore much more difficult to control on curved surfaces such as steel mill rolls. In ESS processes using strip electrodes, the strip electrodes have a relatively large surface area (compared to wires) which surface area prevents the free flow of slag and helps retain the slag in the proper location. However, molten slag flows freely around wires in ESS using wires, which results in a tendency for slag to roll off curved surfaces, thereby disrupting the surfacing process.

This invention employs a combination of techniques in order to address problems associated with slag flow when using wire electrodes. In particular, the process employs a relatively small slag pool in comparison to ESS processing using strip electrodes, although the slag pool is large enough to support a stable ESS operation. This smaller slag pool is more manageable and has less of a tendency to flow off curved surfaces. It is preferred that the slag pool extend only a short distance in front of and to the sides of the molten metal bead being deposited.

A vibratory flux feeder 7 is used rather than a conventional gravity feeder, which vibratory feeder allows smaller amounts of flux to be fed more precisely into the slag pool.

Small, controlled amounts of flux (not shown) are fed into the back of the slag pool, behind the electrodes a short distance spaced circumferentially thereof in the direction of rotation of the substrate. This additional flux serves as a heat sink to lower the temperature of the slag pool, thus rendering it less fluid with less of a tendency to flow off curved surfaces.

A vacuum pick up (not shown) is used to remove unmelted flux from behind the slag pool, i.e., from where the slag pool is being rotated away from the electrodes. The resulting air flow results in faster freezing of the slag pool, rendering it less fluid.

A leading edge slag barrier in the form of a fine bristled stainless steel brush 11 is positioned in front of the slag pool such that unmelted flux builds up in front of the molten slag pool. In the embodiment of the invention involving deposition onto a rotating steel mill roll, the brush is positioned a short distance circumferentially in front of the electrodes, such that fresh substrate is rotated under the brush just prior to being rotated under the electrodes. This build up of unmelted flux serves as a barrier to prevent slag from flowing off the substrate. The brush is sufficiently flexible that it conforms to the contours of the substrate, and such that the built up unmelted flux similarly conforms to such contours. It can be seen that the set up is free from any slag barrier opposite the leading edge slag barrier or elsewhere.

Figure 4:
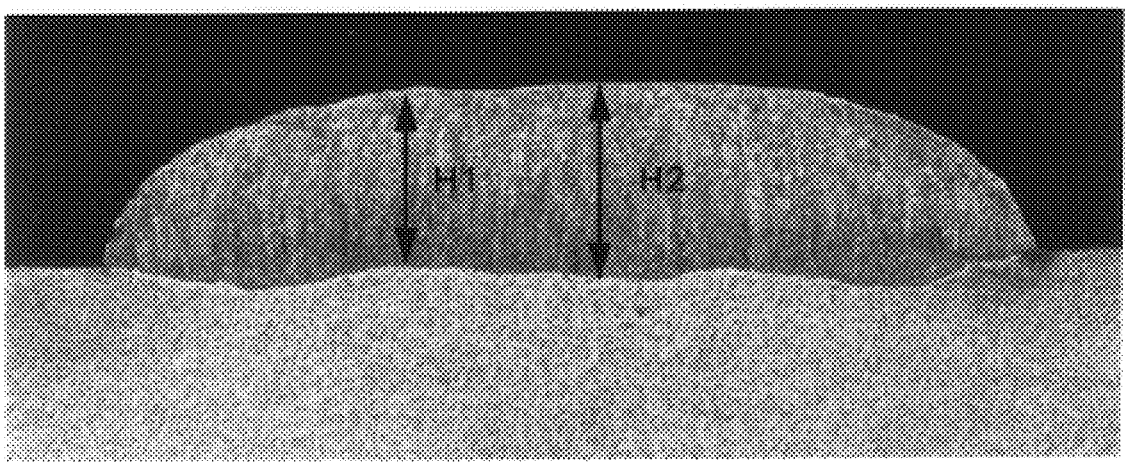
FIG. 4 is a photomicrograph of a metal deposit made in accordance with the process of the invention shown in cross section.

A second major obstacle to using ESS with wires relates to achieving a uniform penetration profile. Conventionally, penetration into the substrate when using a wire electrode is deepest at a point intersected by the longitudinal axis of the wire. When using two or more wires side-by-side there is relatively deep penetration at the points intersected by the longitudinal axes of the wires and relatively shallow penetration at the point half way between the wires. This disadvantageously produces a non-uniform profile having a wave-like appearance, as is illustrated by the twin wire profile for SAW welding shown in FIG. 5. To address this problem the current invention practices electrode oscillation back and forth a set distance transverse to the direction of rotation of the substrate, i.e., transverse to the direction of movement of the electrodes with respect to the substrate. This results in uniform distribution of heat over the width of the overlay bead, and production of a more uniform profile as shown in FIG. 4. Too slow an oscillation rate can result in uneven bead edges and poor interbead fusion. Too high an oscillation rate can render the deposition process unstable. As such, an oscillation rate is selected which is between about 20 cycles per minute and about 40 cycles per minute, preferably between about 27 and about 33 cycles per minute. The width of the oscillation path is between about 6 mm (¼ inch) and about 38 mm (1½ inch), preferably between about 19 mm (¾ inch) and about 25 mm (1 inch).

Figure 5:
FIG. 5 is a photomicrograph of a comparative metal deposit made by SAW using a twin wire electrode.

While this oscillation provides a uniform deposit profile at the base of the deposit, it also advantageously produces a relatively flat deposit profile on the top of the deposit, as compared to a non-oscillating deposit, as can be seen by comparing FIG. 4 to FIG. 5. This profile in FIG. 4 corresponds to improved interbead tie-in and to a substantial reduction in the amount of machining required to produce a flat roll surface. The shape of the bead of the invention is therefore such that both the bottom and the top of the bead are relatively flat. In particular, the distance between the top and bottom of the bead within the center about 60% of the bead, i.e., in about 20% or more from each edge, does not vary by more than about 20%, preferably not by more than about 15%. In FIG. 4, therefore, any two cross sectional heights H1 and H2 are therefore no more than about 20% different. Furthermore, in this center portion of the bead, the bead is relatively flat on its top and its bottom such that neither the depth of the bottom nor the height of the top vary by more than about 10% of the total height of the bead. This is in contrast to the very rounded appearance of the top of the bead shown in FIG. 5 and the very wavy appearance of the bottom of the bead shown in FIG. 5. It can be seen from FIG. 4 that the penetration of the bead into the substrate is shallow in comparison to the penetration of the bead in FIG. 5. In particular, on average no more than about 20% of the height of the one-layer bead in FIG. 4 lies below the surface line of the substrate.

Figure 3A:
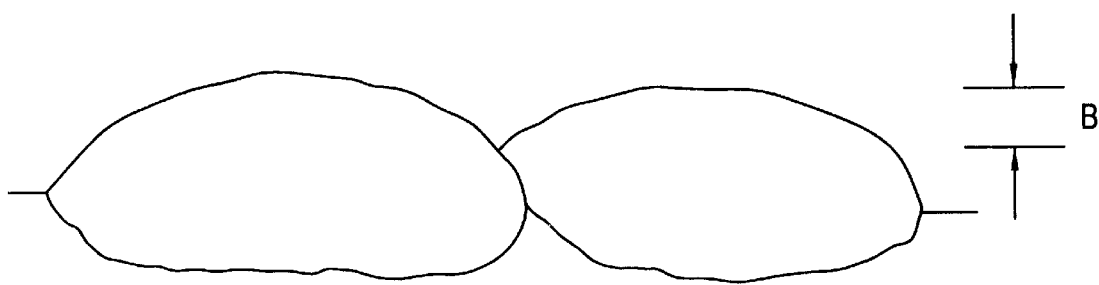
FIG. 3 is a schematic comparison of a metal deposit made in accordance with the invention to a metal deposit made by submerged arc welding.
Figure 3B:

To illustrate the advantages of the bead shape of the invention, a schematic comparison of a series of adjacent deposits by the ESS with wire process of the invention to a series of adjacent deposits by SAW is presented in FIG. 3. It can be seen that the ESS with wire deposit only has to be machined a depth of A (on the order of 0.2 mm) to produce a flat surface, while the SAW deposit must be machined a depth of B (on the order of 2 mm). The process of the invention, therefore, results in savings in machining time, labor and costs, and avoids substantial waste associated with depositing material which is then machined away.

A further advantage achieved by the invention is a reduction in flux consumption. This is achieved because an acceptable deposit can be achieved by application of one or two layers versus up to six layers required with SAW. It is also achieved due to the fact that a relatively smaller slag pool is used, and because flux and slag flow off curved substrates is held to a minimum.

The following examples further illustrate the invention:

EXAMPLE 1

Deposits were made using the ESS with wire process of the invention and using conventional SAW with the same wire for purposes of comparison. For this example, the wire sheath composition by weight percent was Mn up to 0.5, Si up to 0.5, C up to 0.08, and Fe balance. The alloy powder composition by weight percent was as follows, with a fill ratio of 27%:

| | |
|---|---|
| C | 0.45–0.55 |
| Mn | 2.8–3.2 |
| Si | 1.0–1.5 |
| Cr | 47.0–47.9 |
| Ni | 8.5–9.5 |
| Mo | 4.0–4.5 |
| Cb | 0.70–0.80 |
| V | 0.55–0.65 |
| Fe | Balance |

The following were the ESS parameters:

Wire diameter: 3/32 inch

Number of wires: 2

Distance between wires: ½ inch

Distance from the substrate to the contact tip: 1½ inches

Current: 550 amps

Voltage: 26–27 volts

Type of flux: Cabo-Ox 4000

Travel speed of the electrode: 4–6 inches/minute

Substrate: ASTM A36 steel

A comparison of the deposit chemistries of six-layer, three-layer, and one-layer SAW deposits to one-and two-layer deposits according to the invention is presented in Table 1. Dilution percentage was calculated on the basis of Cr and Ni. Six layers of alloy deposited by SAW are typically necessary to hard face steel mill rolls, thus, the chemistry of a six layer deposit is considered the standard to which other deposits are compared. These data illustrate that the dilution objectives discussed above are achieved, as the one-layer deposit of the invention resulted in about 23% dilution, and the two-layer electroslag deposit resulted in about 5% or less dilution. These results establish that filled-core wires can be used to deposit weld metal in electroslag mode resulting in low dilution surfacing deposits capable of attaining the final required chemistries in one or two layers.

TABLE 1

Comparison of deposit chemistries made by SAW and ESS process of the invention using wire of the same composition

| | Mn | Si | Cr | Ni | Mo | Cb | V | Apprx Dil % |
|---|---|---|---|---|---|---|---|---|
| 6-layer SAW | 1.1 | 0.3 | 14.3 | 2.5 | 1.2 | 0.18 | 0.19 | 0 |
| 3-layer SAW | 1.1 | 0.3 | 12.1 | 2.1 | 1.0 | 0.16 | 0.17 | 15 |
| 1-layer SAW | 1 | 0.2 | 5.8 | 1.0 | 0.5 | 0.08 | 0.10 | 60 |
| 1-layer Process of Invention | 0.9 | 0.3 | 11.0 | 1.9 | 0.9 | 0.16 | 0.16 | 23 |

TABLE 1-continued

Comparison of deposit chemistries made by SAW and ESS process of the invention using wire of the same composition

|  | Mn | Si | Cr | Ni | Mo | Cb | V | Apprx Dil % |
|---|---|---|---|---|---|---|---|---|
| 2-layer Process of Invention | 0.9 | 0.4 | 13.6 | 2.5 | 1.1 | 0.17 | 0.18 | <5 |

EXAMPLE 2

A single-layer deposit was made on plate steel (AISI 4140) employing the ESS with wire process of the invention. A photomicrograph of the deposit is depicted in FIG. 4, illustrating the deposit had a height of roughly 6 mm. The deposit chemistries measured at the surface of the deposit, and at 3 mm, 2 mm and 1 mm from the base of the deposit are presented in Table 2.

This analysis shows a relatively constant chemistry from the surface of the deposit through to a depth of 1 mm from its base. This is a significant advantage for corrosion and wear applications such as in steel mill rolls because the wear surface even after substantial corrosion and wear in service will have chemistry and properties comparable to that of a fresh deposit. For purposes of comparison, the chemistry of a six-layer SAW deposit is presented. The dilution in a single layer with the process of the invention is about 16% based on Cr content. By comparison a single layer two wire oscillated SAW deposit shows a dilution of about 30%.

TABLE 2

Evaluation of chemistry through depth of deposit

| Position | C | Mn | Si | Cr | Ni | Mo | P | S | Nb | V |
|---|---|---|---|---|---|---|---|---|---|---|
| Surface | 0.17 | 0.8 | 0.5 | 11.3 | 1.8 | 0.9 | 0.011 | 0.008 | 0.18 | 0.21 |
| 3 mm from base metal | 0.17 | 0.8 | 0.5 | 11.2 | 1.8 | 0.9 | 0.007 | 0.010 | 0.18 | 0.20 |
| 2 mm from base metal | 0.18 | 0.8 | 0.5 | 11.1 | 1.8 | 0.9 | 0.003 | 0.009 | 0.18 | 0.21 |
| 1 mm from base metal | 0.17 | 0.8 | 0.5 | 10.7 | 1.8 | 0.9 | 0.018 | 0.010 | 0.16 | 0.19 |
| SAW six layers | 0.08 | 1.1 | 0.5 | 13.4 | 2.5 | 1.3 | 0.023 | 0.008 | 0.19 | 0.25 |
| SAW single layer | 0.26 | 0.9 | 0.4 | 9.4 | 1.3 | 0.7 | 0.016 | 0.008 | 0.09 | 0.11 |

EXAMPLE 3

Oxygen in overlay deposits can result in an increase in the volume fraction of inclusions, which can have a deleterious effect on toughness and corrosion resistance. In order to evaluate the performance of the invention in this regard, deposits comprising one and two layers were made using the ESS with wire process of the invention, as were deposits using SAW with the same composition wire. The oxygen contents of the deposits were determined to be as follows:

| | Oxygen content by weight % | | |
|---|---|---|---|
| | One layer | Two layers | Three layers |
| Process of the invention | 0.029 | 0.023 | |
| SAW (with wire) | 0.034 | 0.036 | 0.043 |

Figure 6:
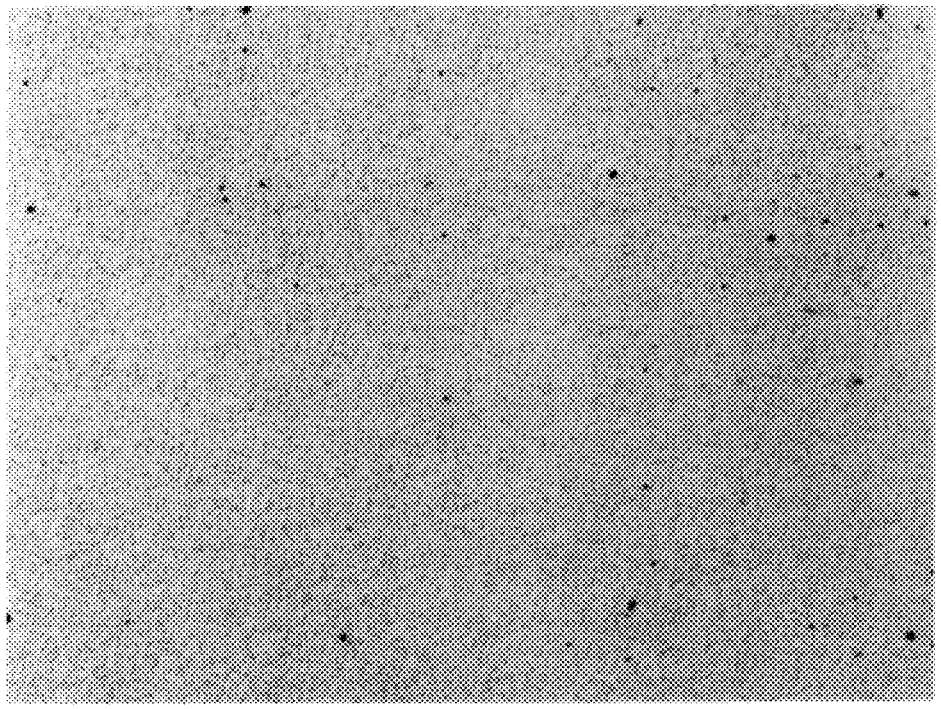
FIG. 6 is a photomicrograph of a polished, unetched surface of a deposit according to the invention at a magnification of 100×.
Figure 7:
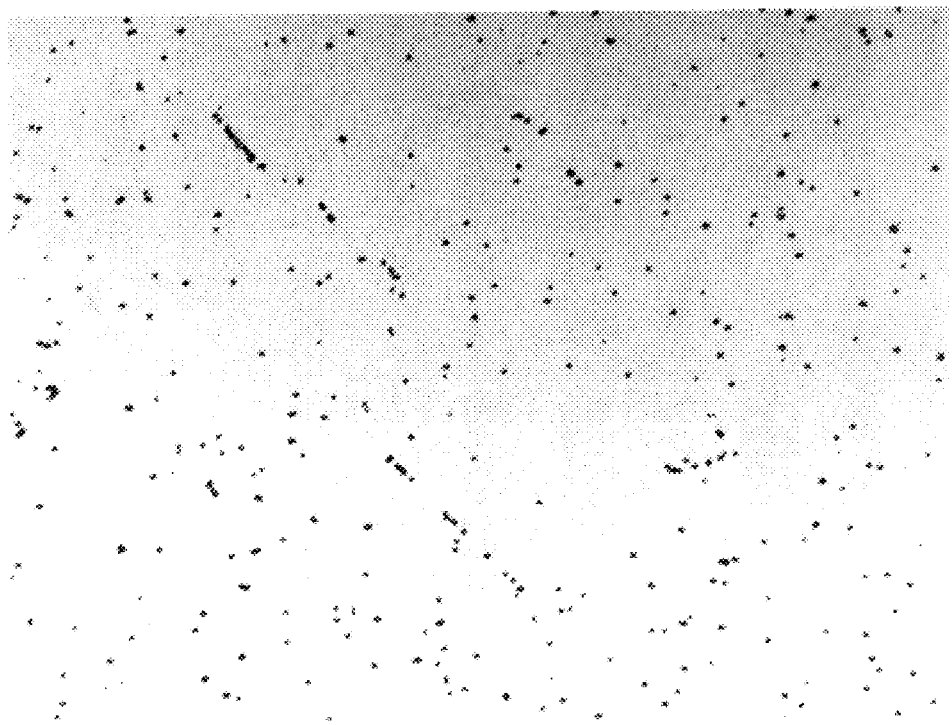
FIG. 7 is a photomicrograph of a polished, unetched surface of a comparative deposit made by SAW at a magnification of 100×.

These data illustrate that the process of the invention produces deposits having reduced oxygen content in comparison to SAW processes currently in use to overlay steel mill rolls and the like. The photomicrographs of FIGS. 6 and 7 illustrate how this reduced oxygen content translates to reduced inclusion volume fraction. The inclusions manifested as black artifacts in the photomicrographs are substantially more prevalent in the SAW deposit than in the deposit produced in accordance with the invention. The lower inclusion volume fraction in the deposit of the invention results in improved toughness and improved resistance to pitting corrosion. This further corresponds to increased life of the deposit on, e.g., steel mill rolls, which in turn corresponds to a lower cost per ton of rolled steel.

In view of the above, it will be seen that the several objects of the invention are achieved and other advantageous results attained.

As various changes could be made in the above concepts without departing from the scope of the invention, it is intended that all matter contained in the above description or shown in the accompanying drawings shall be interpreted as illustrative and not in a limiting sense.

What is claimed is:

1. A method for depositing a high alloy stainless steel overlayer onto a substrate comprising:

oscillating between one and six wire electrodes above said substrate;

feeding flux onto said substrate while applying a total current to said electrodes sufficient to create a molten slag pool and maintain said molten slag pool by ohmic heating of said flux to deposit said overlayer by electroslag surfacing onto said substrate; and mechanically restraining said flux and molten slag pool on said substrate with a leading edge barrier positioned such that fresh substrate onto which overlayer is to be deposited is rotated under said barrier prior to passing under said electrode.

2. A method for depositing a high alloy stainless steel overlayer onto an elongate cylindrical substrate comprising:

securing the substrate horizontally in a fixture adapted to rotate the substrate about a horizontal axis thereof, the substrate having a circumference comprising a bottom arcuate segment, two side arcuate segments, and a top arcuate segment directly opposite and above the bottom arcuate segment;

maintaining an electrode comprising at least one wire above said top arcuate segment of said substrate while feeding flux onto said top arcuate segment;

applying a total current to said electrode sufficient to create a molten metal pool and a molten slag pool and maintain said molten slag pool by ohmic heating of said flux to deposit said overlayer onto the top arcuate segment of said substrate; and rotating said substrate about said horizontal axis to continually present fresh substrate to said electrode;

wherein said electrode contains Ni and Cr and said overlayer comprises at least a first layer in contact with the substrate, wherein dilution of Ni and Cr in said first layer is less than about 25%.

3. A method for depositing a high alloy stainless steel overlayer onto a substrate comprising:

maintaining between one and six wire electrodes above said substrate; and feeding flux onto said substrate while applying a total current to said electrodes sufficient to maintain a molten slag pool by ohmic heating of said flux to deposit said overlayer by electroslag surfacing onto said substrate;

wherein said electrode contains Ni and Cr and said overlayer comprises at least a first layer in contact with the substrate, wherein dilution of Ni and Cr in said first layer is less than about 25%.

4. The method of claim 2 wherein said electrode consists of between one and six filled-core wires.

5. A method for depositing a high alloy stainless steel overlayer onto an elongate cylindrical substrate comprising:

securing the substrate horizontally in a fixture adapted to rotate the substrate about a horizontal axis thereof, the substrate having a circumference comprising a bottom arcuate segment, two side arcuate segments, and a top arcuate segment directly opposite and above the bottom arcuate segment;

maintaining an electrode comprising at least one wire above said top arcuate segment of said substrate while feeding flux onto said top arcuate segment;

applying a total current to said electrode sufficient to maintain a molten slag pool by ohmic heating of said flux to deposit said overlayer onto the top arcuate segment of said substrate;

rotating said substrate about said horizontal axis to continually present fresh substrate to said electrode; and mechanically restraining said flux and molten slag pool on said substrate with a leading edge barrier positioned such that fresh substrate onto which overlayer is to be deposited is rotated under said barrier prior to passing under said electrode.

6. The method of claim 5 wherein said molten slag pool is free of any barrier opposite said leading edge barrier.

7. The method of claim 6 wherein said molten slag pool is free of any barrier other than said leading edge barrier.

8. A method for depositing a high alloy stainless steel overlayer onto an elongate cylindrical substrate comprising:

securing the substrate horizontally in a fixture adapted to rotate the substrate about a horizontal axis thereof, the substrate having a circumference comprising a bottom arcuate segment, two side arcuate segments, and a top arcuate segment directly opposite and above the bottom arcuate segment;

maintaining an electrode comprising at least one wire above said top arcuate segment of said substrate while feeding flux onto said top arcuate segment;

applying a total current to said electrode sufficient to maintain a molten slag pool by ohmic heating of said flux to deposit said overlayer onto the top arcuate segment of said substrate;

rotating said substrate about said horizontal axis to continually present fresh substrate to said electrode; and applying a vacuum pick up above said slag pool to remove unmelted flux therefrom and to increase air flow around said slag pool to speed cooling thereof and thereby reduce the tendency of said slag pool to roll off said top arcuate segment;

wherein said electrode contains Ni and Cr and said overlayer comprises at least a first layer in contact with the substrate, wherein dilution of Ni and Cr in said first layer is less than about 25%.

9. A method for depositing a high alloy stainless steel overlayer onto an elongate cylindrical substrate comprising:

securing the substrate horizontally in a fixture adapted to rotate the substrate about a horizontal axis thereof, the substrate having a circumference comprising a bottom arcuate segment, two side arcuate segments, and a top arcuate segment directly opposite and above the bottom arcuate segment;

maintaining an electrode comprising at least one wire above said top arcuate segment of said substrate while feeding flux onto said top arcuate segment;

applying a total current to said electrode sufficient to maintain a molten slag pool by ohmic heating of said flux to deposit said overlayer onto the top arcuate segment of said substrate;

rotating said substrate about said horizontal axis to continually present fresh substrate to said electrode; and oscillating said electrode at a rate between about 20 and about 40 cycles per minute;

wherein said electrode contains Ni and Cr and said overlayer comprises at least a first layer in contact with the substrate, wherein dilution of Ni and Cr in said first layer is less than about 25%.

10. The method of claim 9 comprising oscillating said electrode across an oscillation path of between about 13 and about 25 mm wide.

11. The method of claim 2 wherein said flux is fed onto the top arcuate segment by a vibrating flux feeder.

12. The method of claim 2 wherein said substrate is an iron-based steel mill roll.

13. The method of claim 2 wherein said first layer comprises a series of adjacent metal deposits consisting of weld beads having a relatively uniform height with a shallow penetration such that no more than about 20% of the cross sectional height of said weld beads penetrates below the surface of the substrate.

14. A method for depositing a high alloy stainless steel overlayer onto a roll comprising:

securing the roll horizontally in a fixture adapted to rotate the substrate about a horizontal axis thereof, the roll having a circumference comprising a bottom arcuate segment, two side arcuate segments, and a top arcuate segment directly opposite and above the bottom arcuate segment;

maintaining an electrode comprising between one and six filled-core wires containing Ni and Cr above said top arcuate segment of said roll while feeding flux onto said top arcuate segment;

oscillating said electrode at a rate of between about 20 cycles per minute and about 40 cycles per minute;

applying a total current to said electrode sufficient to create a molten metal pool and a molten slag pool and maintain said molten slag pool by ohmic heating of said flux to deposit said overlayer onto the top arcuate segment of said roll; and rotating said substrate about said horizontal axis to continually present fresh substrate to said electrode;

wherein dilution of Ni and Cr in said overlayer is less than about 25%.

15. A method for depositing a high alloy stainless steel overlayer onto an elongate cylindrical steel mill roll comprising:

- securing the steel mill roll horizontally in a fixture adapted to rotate the steel mill roll about a horizontal axis thereof, the steel mill roll having circumference comprising a bottom arcuate segment, two side arcuate segments, and a top arcuate segment directly opposite and above the bottom arcuate segment;
- oscillating two filled-core Ni-containing and Cr-containing wire electrodes spaced apart between about 6 mm and about 25 mm at a rate of between about 20 cycles per minute and about 40 cycles per minute with an oscillation path width of between about 13 mm and about 25 mm per electrode while maintaining said electrodes above said top arcuate segment of said roll a distance of between about 25 mm and about 50 mm;
- feeding flux onto said top arcuate segment of said roll around said electrodes by a vibrating flux feeder;
- applying a total current to said electrodes of between about 300 and about 1200 amps to deposit said overlayer onto said top arcuate segment within a molten slag pool maintained by ohmic heating of said flux, wherein dilution of Ni and Cr in said deposit is maintain below about 25%;
- rotating said steel mill roll about its horizontal axis at a speed of between about 100 mm and about 250 mm per minute to continually present fresh roll to said electrodes;
- holding a stainless steel brush against said roll at a position in front of said electrodes such that the roll is rotated under said brush prior to traveling under said electrodes to prevent molten slag from rolling off the roll; and
- applying a vacuum pick up at a distance above said molten slag pool to remove excess flux and to increase air flow above the molten slag pool thereby increasing a rate at which said slag pool solidifies.

* * * * *